US012699378B2

(12) United States Patent
Kung et al.

(10) Patent No.: US 12,699,378 B2
(45) Date of Patent: Aug. 4, 2026

(54) AUTONOMOUS EVALUATION METHOD AND AUTONOMOUS EVALUATION DEVICE FOR SEMICONDUCTOR SMART MANUFACTURING

(71) Applicant: United Microelectronics Corp., Hsinchu (TW)

(72) Inventors: Yung-Chien Kung, Tainan City (TW); Li-Hsin Yang, Tainan City (TW); Chung-Hsien Wu, Hsinchu City (TW); Pang-Min Wang, Taoyuan City (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 338 days.

(21) Appl. No.: 18/423,356

(22) Filed: Jan. 26, 2024

(65) Prior Publication Data

US 2025/0216833 A1    Jul. 3, 2025

(30) Foreign Application Priority Data

Dec. 29, 2023    (TW) .................................. 112151566

(51) Int. Cl.
G05B 19/4155        (2006.01)
(52) U.S. Cl.
CPC .................... G05B 19/4155 (2013.01); G05B 2219/45031 (2013.01)

(58) Field of Classification Search
CPC .................. G05B 19/4155; G05B 2219/45031
See application file for complete search history.

(56) References Cited

U.S. PATENT DOCUMENTS

| | | | |
|---|---|---|---|
| 11,012,381 B2 | 5/2021 | Chavda | |
| 11,580,604 B1 | 2/2023 | Konrardy et al. | |
| 2015/0287621 A1* | 10/2015 | Xiao .................. | G05B 19/4183 700/108 |
| 2019/0236511 A1* | 8/2019 | Xu ...................... | G06Q 10/0633 |
| 2020/0073639 A1* | 3/2020 | Prasad ...................... | G06F 8/10 |

* cited by examiner

*Primary Examiner* — Tameem D Siddiquee
(74) *Attorney, Agent, or Firm* — WPAT, PC

(57) ABSTRACT

An autonomous evaluation method and an autonomous evaluation device for semiconductor smart manufacturing are provided. The autonomous evaluation method for the semiconductor smart manufacturing includes the following steps. For each of a plurality of apparatuses, a task completion ratio of each of a plurality of automation functions implemented in a plurality process tasks is analyzed. The task completion ratios of the automation functions are mapped to an evaluation matrix to obtain a depth level corresponding to each of the apparatuses. A plurality of expansion ratios corresponding to the depth levels of the apparatuses are analyzed. A comprehensive indicator is analyzed according to the depth levels and the expansion ratios.

8 Claims, 12 Drawing Sheets

Current status

| Task | Automatic data collection | Automatic reporting | Automatic analysis | Automatic recommendation | Automating execution | Automatic monitoring |
|---|---|---|---|---|---|---|
| Process task 1 | ✓ | ✓ | ✓ | ✓ | ✓ | ✓ |
| Process task 2 | ✓ | ✓ | ✓ | ✓ | ✓ | ✓ |
| Process task 3 | ✓ | ✓ | ✓ | ✓ | ✓ | ✓ |
| Process task 4 | ✓ | ✓ | ✓ | ✗ | ✗ | ✗ |
| ⋮ | ⋮ | ⋮ | ⋮ | ⋮ | ⋮ | ⋮ |
| Process task 20 | ✓ | ✓ | ✓ | ✓ | ✗ | ✗ |
| Task completion ratio | 100% | 100% | 100% | 90% | 60% | 60% |

FIG. 5

Setting target

FNj

| Task | Automatic data collection | Automatic reporting | Automatic analysis | Automatic recommendation | Automating execution | Automatic monitoring |
|------|---------------------------|---------------------|--------------------|--------------------------|----------------------|----------------------|
| Process task 1 | ✓ | ✓ | ✓ | ✓ | ✓ | ✓ |
| Process task 2 | ✓ | ✓ | ✓ | ✓ | ✓ | ✓ |
| Process task 3 | ✓ | ✓ | ✓ | ✓ | ✓ | ✓ |
| Process task 4 | ✓ | ✓ | ✓ | ✓ | ✗ | ✗ |
| ⋮ | ⋮ | ⋮ | ⋮ | ⋮ | ⋮ | ⋮ |
| Process task 20 | ✓ | ✓ | ✓ | ✓ | ✓ | ✓ |
| Task completion ratio | 100% | 100% | 100% | 100% | 95% | 95% |

TSk

RTij

| Control mode | | Evaluation matrix(Taking the system main control ratio as the scoring criterion) FNj | | | | | |
|---|---|---|---|---|---|---|---|
| | | Automatic data collection | Automatic reporting | Automatic analysis | Automatic recommendation | Automating execution | Automatic monitoring |
| Human control | Level 0 | 80% | 80% | 50% | 0% | 0% | 0% |
| | Level 1 | 100% | 100% | 80% | 20% | 0% | 0% |
| | Level 2 | 100% | 100% | 100% | 50% | 20% | 20% |
| Systme control | Level 3 | 100% | 100% | 100% | 80% | 60% | 60% |
| | Level 4 | 100% | 100% | 100% | 100% | 95% | 95% |
| | Level 5 | 100% | 100% | 100% | 100% | 100% | 100% |

LVm

RTmj

RTmj

FIG. 7

| Depth level | Level 0 | Level 1 | Level 2 | Level 3 | Level 4 | Level 5 |
|---|---|---|---|---|---|---|
| Level | Personnel operation | Assistive intelligence | Partial intelligence | Conditional intelligence | Highly intelligent | Completely intelligent |
| Mode | Human control/System assistant | | | System control | | |
| Human | Human operation /decision /execution | Human decision /execution | Human activation /monitoring /readiness to intervene /intervene | When the system has needs, human needs to intervene /intervene | Most do not require human intervention /intervention | No human intervention /intervention required at all |
| System | Some system tools | Intelligent auxiliary tools | Intelligent execution tools | Execution under specific circumstances | Executed in most situations | Execute in all situations |

LVm

FIG. 8

| Control mode | | Evaluation matrix(Taking the system main control ratio as the scoring criterion) | | | | | |
|---|---|---|---|---|---|---|---|
| | | Automatic data collection | Automatic reporting | Automatic analysis | Automatic recommendation | Automating execution | Automatic monitoring |
| Human control | Level 0 | 80% | 80% | 50% | 0% | 0% | 0% |
| | Level 1 | 100% | 100% | 80% | 20% | 0% | 0% |
| | Level 2 | 100% | 100% | 100% | 50% | 20% | 20% |
| Systme control | Level 3 | 100% | 100% | 100% | 80% | 60% | 60% |
| | Level 4 | 100% | 100% | 100% | 100% | 95% | 95% |
| | Level 5 | 100% | 100% | 100% | 100% | 100% | 100% |

FIG. 9

LVm

EPi

| Model | Apparatus | Depth level |
|---|---|---|
| POLYE (50 units) | POLYE-01 | Level 3 |
| | POLYE-02 | Level 3 |
| | POLYE-03 | Level 2 |
| | ... | |
| | POLYE-50 | Level 2 |

| Task | Automatic data collection | Automatic reporting | Automatic analysis | Automatic recommendation | Automating execution | Automatic monitoring |
|---|---|---|---|---|---|---|
| Process task 1 | V | V | V | V | V | V |
| Process task 2 | V | V | V | V | V | V |
| Process task 3 | V | V | V | V | V | V |
| Process task 4 | V | V | V | X | X | X |
| ... | ... | ... | ... | ... | ... | ... |
| Process task 20 | V | V | V | V | X | X |
| Total | 100% | 100% | 100% | 90% | 60% | 60% |
| Depth level | | | | Level 3 | | |

FIG. 10

LVm⌐

| Model | Level 0 | Level 1 | Level 2 | Level 3 | Level 4 | Level 5 |
|-------|---------|---------|---------|---------|---------|---------|
| POLYE | 0% | 0% | 90% | 10% | 0% | 0% |
| | 0 unit | 0 unit | 45 units | 5 units | 0 unit | 0 unit |

WDm

FIG. 11

LVm⌐                WDm

| Model | Level 0 | Level 1 | Level 2 | Level 3 | Level 4 | Level 5 |
|-------|---------|---------|---------|---------|---------|---------|
| POLYE | 0% | 0% | 90% | 10% | 0% | 0% |

Comprehensive indicator IX=0*0%+1*0%+2*90%+3*10%+4*0%+5*0%=2.1

FIG. 12

AUTONOMOUS EVALUATION METHOD AND AUTONOMOUS EVALUATION DEVICE FOR SEMICONDUCTOR SMART MANUFACTURING

This application claims the benefit of Taiwan application Serial No. 112151566, filed Dec. 29, 2023, the disclosure of which is incorporated by reference herein in its entirety.

TECHNICAL FIELD

The disclosure relates in general to a method and a device for smart manufacturing, and more particularly to an autonomous evaluation method and an autonomous evaluation device for semiconductor smart manufacturing.

BACKGROUND

In order to improve process stability and reduce errors and particle contamination caused by human intervention, smart manufacturing technology is gradually introduced into the semiconductor process. However, there are many types and models of the manufacturing apparatus in the semiconductor factory, and the process procedures are complicated. For the semiconductor factory, it is really difficult to evaluate the smart manufacturing implement degree in the semiconductor factory.

Especially when comparing the smart manufacturing implement degree among multiple semiconductor factories, it is impossible to compare in a quantitative manner, and it is impossible to effectively promote and monitor the implement of the smart manufacturing in the semiconductor factories.

SUMMARY

The disclosure is directed to an autonomous evaluation method and an autonomous evaluation device for semiconductor smart manufacturing. The depth levels and the expansion ratios are analyzed. The smart manufacturing implement degree in the semiconductor factory can be qualitatively and quantitatively analyzed, which is helpful for the evaluation and monitoring of the smart manufacturing in the semiconductor factory.

According to one embodiment, an autonomous evaluation method for semiconductor smart manufacturing is provided. The autonomous evaluation method for the semiconductor smart manufacturing includes the following steps: analyzing, for each of a plurality of apparatuses, a task completion ratio of each of a plurality of automation functions implemented in a plurality of process tasks; mapping the task completion ratios of the automation functions to an evaluation matrix, to obtain a depth level corresponding to each of the apparatuses; analyzing a plurality of expansion ratios corresponding to the depth levels of the apparatuses; and analyzing a comprehensive indicator according to the depth levels and the expansion ratios.

According to another embodiment, an autonomous evaluation device for semiconductor smart manufacturing is provided. The autonomous evaluation device for the semiconductor smart manufacturing includes a task evaluating unit, a depth analyzing unit, an expansion analyzing unit and an indicator analyzing unit. The task evaluating unit is configured to analyze, for each of a plurality of apparatuses, a task completion ratio of each of a plurality of automation functions implemented in a plurality of process tasks. The depth analyzing unit is configured to map the task completion ratios of the automation functions to an evaluation matrix, to obtain a depth level corresponding to each of the apparatuses. The expansion analyzing unit is configured to analyze a plurality of expansion ratios corresponding to the depth levels of the apparatuses. The indicator analyzing unit is configured to analyze a comprehensive indicator according to the depth levels and the expansion ratios.

BRIEF DESCRIPTION OF THE DRAWINGS

FIG. 5 illustrates the current status of the task completion ratio for a certain apparatus.

FIG. 6 illustrates the setting target of the task completion ratio of the apparatus in FIG. 5.

FIG. 7 illustrates an example of an evaluation matrix.

FIG. 8 illustrates various depth levels.

FIG. 9 illustrates how the task completion ratios in FIGS. 5 and 6 correspond to the evaluation matrix.

FIG. 10 illustrates the depth levels of the plurality of apparatuses.

FIG. 11 illustrates an example of the expansion ratios of the apparatus.

FIG. 12 illustrates the analysis of the comprehensive indicator.

Figure 1:
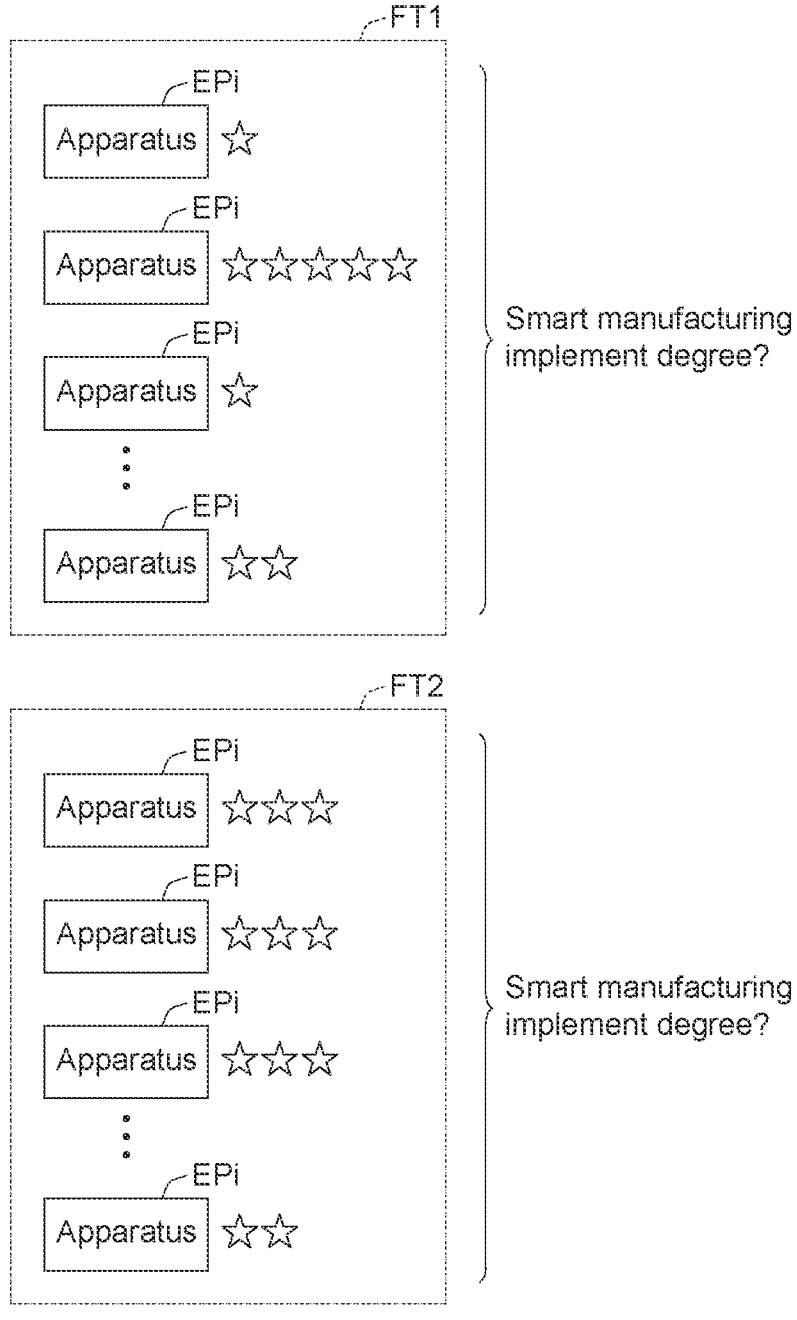
FIG. 1 illustrates the evaluation of the semiconductor smart manufacturing implement degree.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

FIG. 1 illustrates the evaluation of the semiconductor smart manufacturing implement degree. In this disclosure, there are a plurality of apparatuses EPi in a semiconductor factory FT1. The apparatuses EPi are classified into five levels according to the smart manufacturing implement degree. The apparatus EPi rated as five-star has the highest smart manufacturing implement degree; the apparatus EPi rated as one-star has the lowest smart manufacturing implement degree.

Please refer to FIG. 1 again. Among the semiconductor factory FT1, only one apparatus EPi has the smart manufacturing implement degree of five-stars, and the other apparatus EPi has the smart manufacturing implement degree of less than two stars. In practice, it is difficult to evaluate the overall smart manufacturing implement degree of the semiconductor factory FT1. In the semiconductor factory FT2, several apparatuses EPi have the smart manufacturing implement degree of three-star, but no apparatus EPi has the smart manufacturing implement degree of five-stars. Therefore, it is difficult to evaluate the overall smart manufacturing implement degree of the semiconductor factory FT2.

Figure 2:
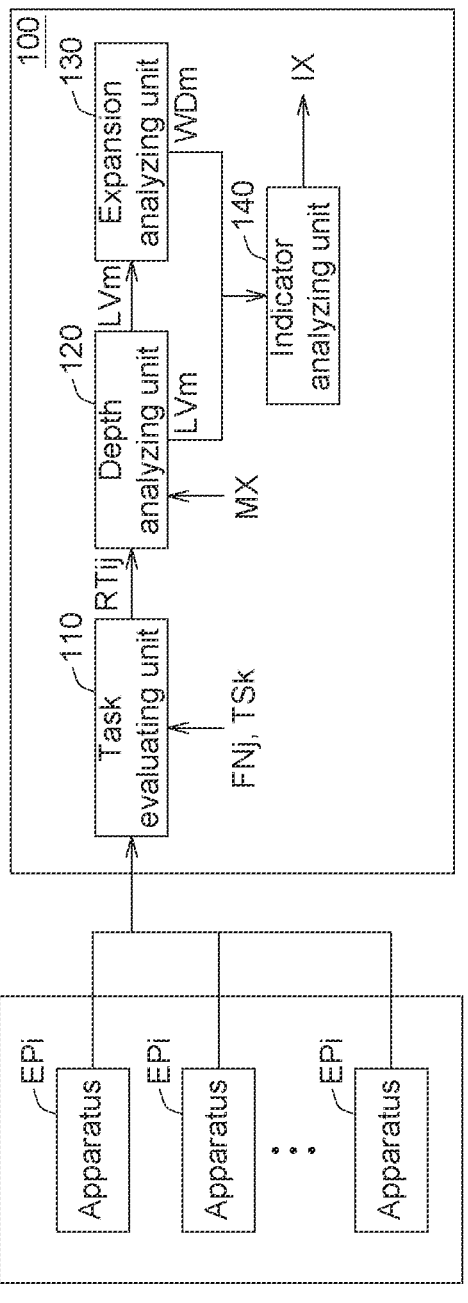
FIG. 2 illustrates a block diagram of an autonomous evaluation device for the semiconductor smart manufacturing according to an embodiment of the present disclosure.

Please refer to FIG. 2, which illustrates a block diagram of an autonomous evaluation device 100 for the semiconductor smart manufacturing according to an embodiment of the present disclosure. The autonomous evaluation device 100 for the semiconductor smart manufacturing includes a task evaluating unit 110, a depth analyzing unit 120, an expansion analyzing unit 130 and an indicator analyzing unit 140. The task evaluating unit 110, the depth analyzing unit 120, the expansion analyzing unit 130 and the indicator analyzing unit 140 are used to perform various judgment procedures, analysis procedures, processing procedures and control procedures, such as a circuit, a circuit board, a storage device storing program code or a chip. The chip is, for example, a central processing unit (CPU), a programmable micro control unit (MCU) with general-purpose, special-purpose, a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar component or a combination of the above components.

In this embodiment, a plurality of depth levels LVm could be analyzed by the depth analyzing unit 120, and a plurality of expansion ratios WDm could be analyzed by the expansion analyzing unit 130. With the depth levels LVm and the expansion ratios WDm, a comprehensive indicator IX could be analyzed. The comprehensive indicator IX could be used as a quantitative evaluation indicator of the smart manufacturing implement degree. The following is a flow chart to explain in detail the operation of each of the above components.

Figure 3:
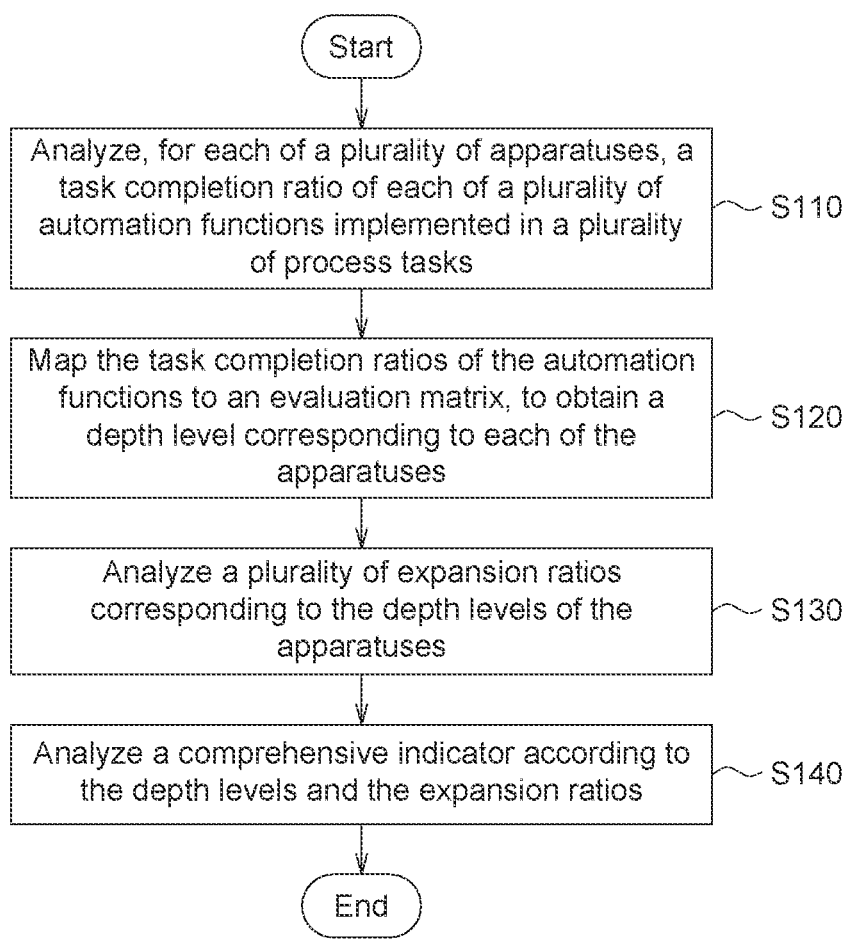
FIG. 3 illustrates a flow chart of an autonomous evaluation method for the semiconductor smart manufacturing according to an embodiment of the present disclosure.

Please refer to FIG. 3, which illustrates a flow chart of an autonomous evaluation method for the semiconductor smart manufacturing according to an embodiment of the present disclosure. The autonomous evaluation method for the semiconductor smart manufacturing of this embodiment includes steps S110 to S140.

In the step S110, as shown in FIG. 2, for the different apparatuses Epi, the task evaluating unit 110 individually analyzes the task completion ratio RTij of each of the automation functions FNj implemented in several process tasks Tsk.

Figure 4:
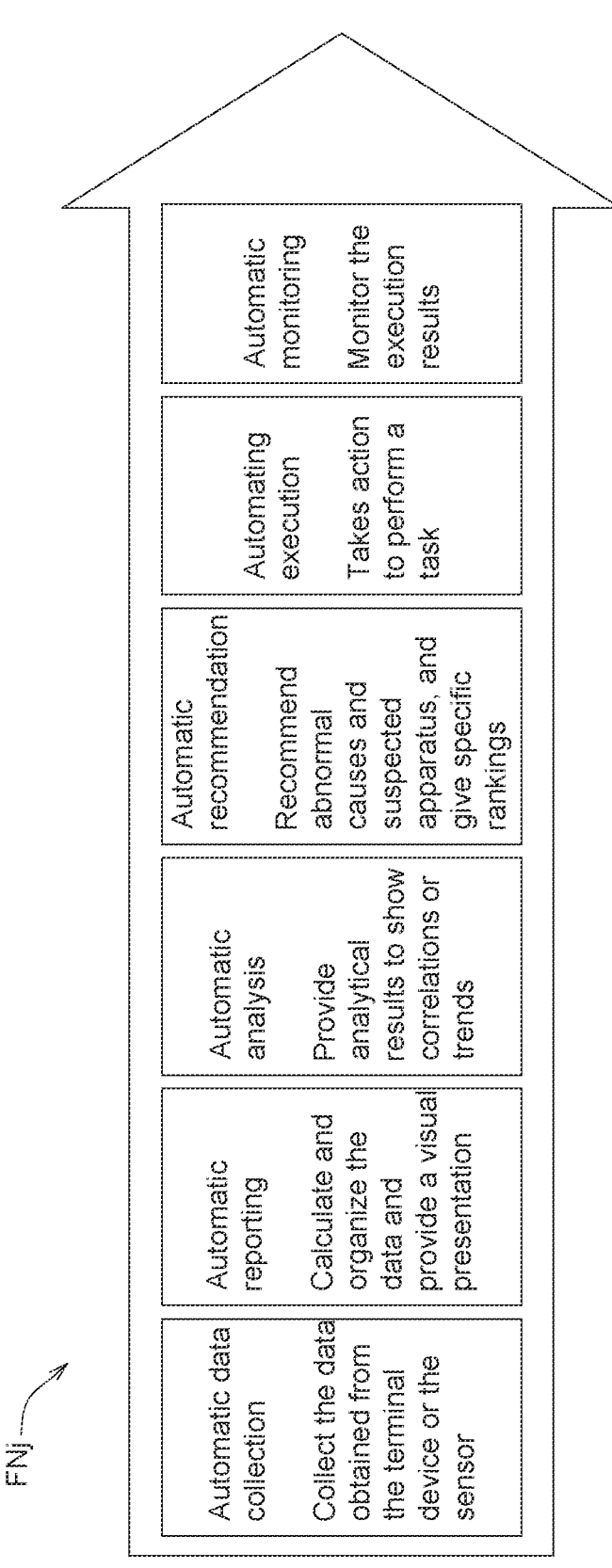
FIG. 4 illustrates the relationship between the automation functions.

Please refer to FIG. 4, which illustrates the relationship between the automation functions FNj. These automation functions FNj include, for example, automatic data collection, automatic reporting, automatic analysis, automatic recommendation, automatic execution and automatic monitoring. Generally speaking, these automation functions FNj are implemented into automation in a progressive manner. In other words, only after the implement of the previous automation function is completed, the implement of the next automation function can be entered.

When implementing the automatic data collection, the system will automatically collect the data obtained from the terminal device or the sensor. When implementing the automatic reporting, the system will calculate and organize the data and provide a visual presentation of the data compiled by the system. When implementing the automatic analysis, the system will provide analytical results to show correlations or trends. When implementing the automatic recommendation, the system will recommend abnormal causes and suspected apparatus, and give specific rankings to these abnormal causes or suspected apparatus. When implementing the automating execution, the system takes action to perform a task to resolve an abnormal condition. For example, when the abnormality of an apparatus EPi is serious, the system will recommend terminating the operation of the apparatus EPi. When implementing the automatic monitoring, the system will monitor the execution results to continuously monitor whether the abnormal situation has been eliminated or whether the function operation has returned to normal. Each of the task completion ratios RTij ranges from 0% to 100%. The analysis method of the task completion ratios RTij is further explained below.

Please refer to FIG. 5, which illustrates the current status of the task completion ratio RTij for a certain apparatus EPi. In this embodiment, the task evaluating unit 110 will individually evaluate whether each of the process tasks TSk for the apparatus EPi has been implemented the automation functions FNj. When one automation function FNj has been implemented in a certain process task TSk, a check will be made in the table in FIG. 5. Then, according to the implementation of each of the automation functions FNj in the several process tasks TSk, the task completion ratio RTij can be obtained.

Taking FIG. 5 as an example, the automatic data collection has been implemented in all 20 process tasks TSk without human intervention. Therefore, the task completion ratio RTij of the automatic data collection is 100%. The automatic reporting and the automatic analysis have been fully implemented in all of the process tasks TSk and can be completed automatically without human intervention, so the task completion ratios RTij are also 100%. The automatic execution and the automatic monitoring are only implemented in ⅔ of the process tasks TSk, so the task completion ratios RTij of the automatic execution and the automatic monitoring are only 60%. FIG. 5 illustrates the current situation of the task completion ratio RTij of a certain apparatus EPi. In the same way, a setting target of the task completion ratio RTij of the apparatus EPi can also be evaluated.

Please refer to FIG. 6, which illustrates the setting target of the task completion ratio RTij of the apparatus EPi in FIG. 5. In FIG. 6, which automation functions FNj may be implemented are evaluated based on each of the process tasks TSk, and checked to complete the table in FIG. 6. As shown in FIG. 6, for this apparatus Epi, the task completion ratio RTij of the automatic monitoring is set to 95%. Through the confirmation in FIG. 6, it can be analyzed which automation function FNj needs to be further implemented in each of the process tasks Tsk.

Next, in the step S120, as shown in FIG. 2, the depth analyzing unit 120 maps the task completion ratios RTij of the automation functions FNj to an evaluation matrix MX to obtain a depth level LVm corresponding to each of the apparatuses EPi. Please refer to FIG. 7, which illustrates an example of an evaluation matrix MX. As shown in FIG. 7, in the evaluation matrix MX, corresponding to different depth levels LVm and different automation functions FNj, a plurality of completion threshold ratios RTmj are recorded. In each of the depth levels LVm, the completion threshold ratios RTmj are the minimum requirements of the task completion ratios RTij for this depth level LVm.

The automatic data collection, the automatic reporting, the automatic analysis, the automatic recommendation, the automatic execution and the automatic monitoring are implemented in a progressive manner. Only after the implementation of the previous automation function FNj is completed, the implementation of the next automation function FNj can be entered. Therefore, for each of the depth levels LVm, the completion threshold ratios RTmj will gradually decrease (or remain unchanged) in an order of the automatic collection, the automatic reporting, the automatic analysis, the automatic recommendation, the automatic execution and the automatic monitoring.

For example, for a certain apparatus Epi, the task completion ratios RTij of the automatic collection, the automatic reporting, the automatic analysis, the automatic recommendation, the automatic execution and the automatic monitoring are "100%, 100%, 100%, 90%, 60%, 60%" respectively. According to the evaluation matrix MX in FIG. 7, those task completion ratios RTij belong to the depth level LVm of "Level 3".

Please refer to FIG. 8, which illustrates various depth levels LVm. The depth levels LVm of the autonomous evaluation method for the semiconductor smart manufacturing is, for example, divided into "Level 0" to "Level 5". The higher the depth level LVm, the lower the degree of human intervention. For example, in the depth level LVm of "Level 0", the apparatus EPi is mainly operated by humans, and only a small part is executed by system tools. In the depth level LVm of "Level 5", the apparatus EPi is completely intelligent, requiring no human intervention or intervention at all, and all scenarios are executed automatically by the system.

Please refer to FIG. 9, which illustrates how the task completion ratios RTij in FIGS. 5 and 6 corresponds to the evaluation matrix MX. In FIG. 5, the task completion ratio RTij of each of the automation functions FNj is "100%, 100%, 100%, 90%, 60%, 60%", which corresponds to the evaluation matrix MX at the box F5 (that is, the depth level LVm of "Level 3"). In FIG. 6, when the task completion ratios RTij of the automation functions FNj are "100%, 100%, 100%, 100%, 95%, 95%", it corresponds to the evaluation matrix MX at the box F6 (that is, the depth level LVm of "Level 4").

Please refer to FIG. 10, which illustrates the depth levels LVm of the plurality of apparatuses EPi. The semiconductor factory usually includes a plurality of apparatuses EPi. Through the above method, the depth level LVm of each of the apparatuses EPi can be analyzed. As shown in FIG. 10, the depth levels LVm of the apparatuses EPi may not be exactly the same.

Next, the process proceeds to the step S130. As shown in FIG. 2, the expansion analysis-analyzing unit 130 analyzes a plurality of expansion ratios WDm corresponding to the depth levels LVm of the apparatus EPi.

Please refer to FIG. 11, which illustrates an example of the expansion ratios WDm of the apparatus EPi. For example, the total number of the apparatuses EPi in a certain factory is 50. After analysis by the expansion analyzing unit 130, it is calculated that there are 45 apparatuses EPi corresponding to the depth level LVm of "Level 2", and there are 5 apparatuses EPi corresponding to the depth level LVm of "Level 3". Therefore, the expansion analyzing unit 130 could calculate the expansion ratio WDm corresponding to the depth level LVm of "Level 2" to be 90%, and calculate the expansion ratio WDm corresponding to the depth level LVm of "Level 3" to be 10%.

In the step S140, the indicator analyzing unit 140 analyzes a comprehensive indicator IX according to the depth levels LVm and the expansion ratios WDm. The comprehensive indicator IX is evaluated simultaneously with the depth levels LVm and the expansion ratios WDm to quantify the smart manufacturing implement degree.

Please refer to FIG. 12, which illustrates the analysis of the comprehensive indicator IX. The comprehensive indicator IX is the sum of the products of the depth levels LVm and the expansion ratios WDm. The calculation equation is: The comprehensive indicator IX=Sum(depth levels LVm*expansion ratios WDm). For example, in the apparatuses EPi of a certain factory, the expansion ratio WDm corresponding to the depth level LVm of "Level 2" is 90%, the expansion ratio WDm corresponding to the depth level LVm of "Level 3" is 10%, the expansion ratio WDm corresponding to the depth level LVm of "Level 0", "Level 1", "Level 4", and "Level 5" are 0%, so the comprehensive indicator IX is 2.1 (that is, 0*0%+1*0%+2*90%+3*10%+4*0%+5*0%=2.1).

Figure 13:
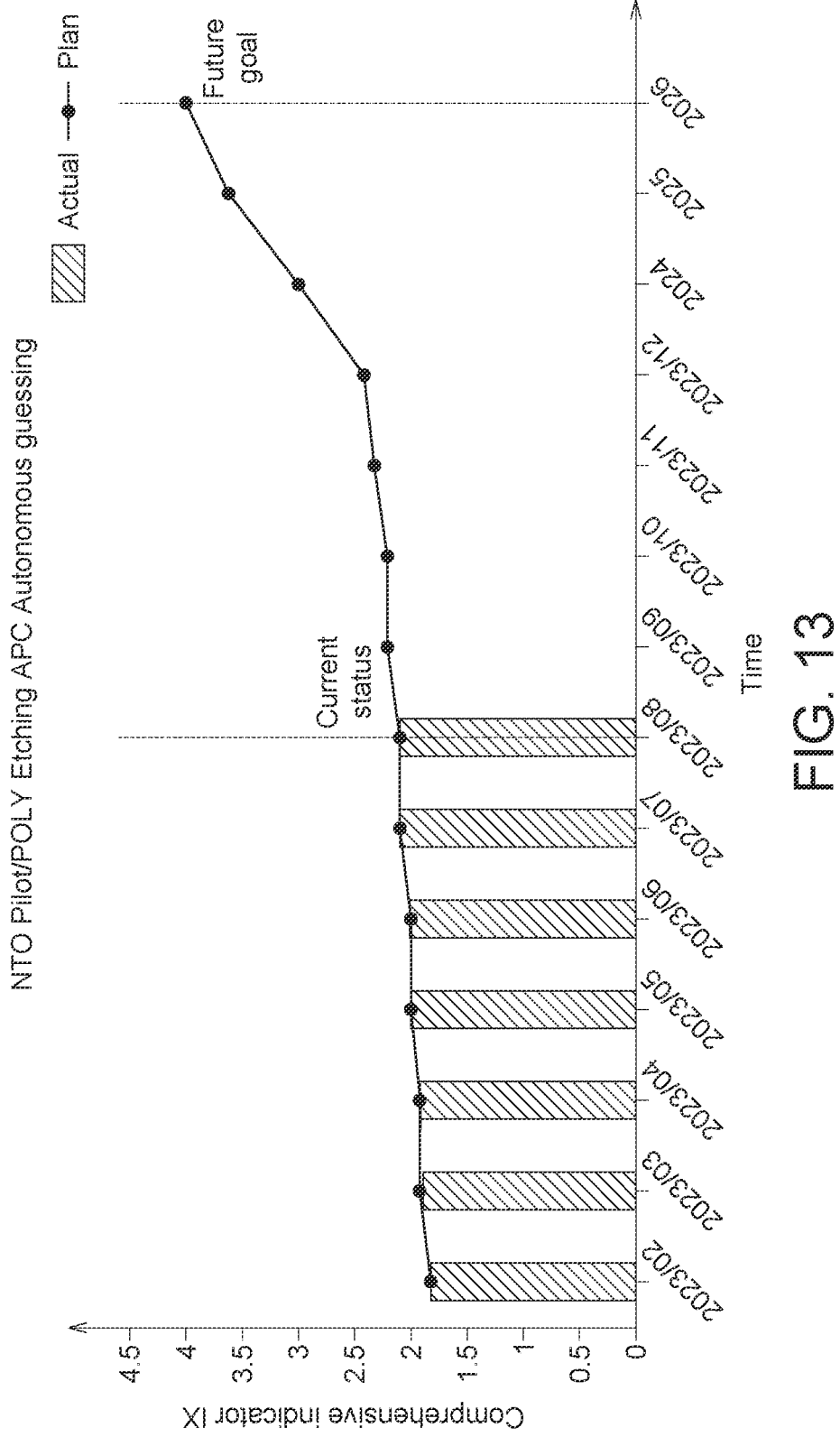
FIG. 13 illustrates the monitoring curve of the comprehensive indicator.

Please refer to FIG. 13, which illustrates the monitoring curve of the comprehensive indicator IX. The comprehensive indicator IX could be used to quantify the semiconductor smart manufacturing implement degree, and can also be used to set control benchmarks for future goals. Through the comprehensive indicator IX, a product roadmap for the short/mid-term for the smart manufacturing implement can be formulated, and the product roadmap can be continuously tracked and managed. For example, the current comprehensive indicator IX is 2.1, and the target of the comprehensive indicator IX can be set to 4.0 in three years. During this period, continuous tracking and progressive management can be carried out to help achieve the target three years later.

According to the above various embodiments, the autonomous evaluation device 100 for the semiconductor smart manufacturing can be used to analyze the depth levels LVm and expansion ratios WDm of the apparatuses EPi, and then obtain the comprehensive indicator IX, so that the smart manufacturing implement degree in the semiconductor factory can be determined qualitatively with quantitative analysis indicators. It effectively helps the semiconductor factory to evaluate and monitor the smart manufacturing technology.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. An autonomous evaluation method for semiconductor smart manufacturing, comprising:

analyzing, for each of a plurality of apparatuses, a task completion ratio of each of a plurality of automation functions implemented in a plurality of process tasks;

mapping the task completion ratios of the automation functions to an evaluation matrix, to obtain a depth level corresponding to each of the apparatuses;

analyzing a plurality of expansion ratios corresponding to the depth levels of the apparatuses;

analyzing a comprehensive indicator according to the depth levels and the expansion ratios, wherein the comprehensive indicator is a sum of products of the depth levels and the expansion ratios; and monitoring the semiconductor smart manufacturing according to the comprehensive indicator.

2. The autonomous evaluation method for the semiconductor smart manufacturing according to claim 1, wherein the automation functions include automatic data collection, automatic reporting, automatic analysis, automatic recommendation, automatic execution and automatic monitoring.

3. The autonomous evaluation method for the semiconductor smart manufacturing according to claim 1, wherein each of the task completion ratios is 0% to 100%.

4. The autonomous evaluation method for the semiconductor smart manufacturing according to claim 1, wherein the depth levels are 0 to 5.

5. The autonomous evaluation method for the semiconductor smart manufacturing according to claim 1, wherein the evaluation matrix records a plurality of completion threshold ratios.

6. The autonomous evaluation method for the semiconductor smart manufacturing according to claim 5, wherein in the evaluation matrix, the completion threshold ratios remain unchanged or increase in an order of the automation functions.

7. The autonomous evaluation method for the semiconductor smart manufacturing according to claim 5, wherein in the evaluation matrix, the completion threshold ratios remain unchanged or increase in an order of the depth levels.

8. An autonomous evaluation device for semiconductor smart manufacturing, comprising:

a task evaluating unit, configured to analyze, for each of a plurality of apparatuses, a task completion ratio of each of a plurality of automation functions implemented in a plurality of process tasks;

a depth analyzing unit, configured to map the task completion ratios of the automation functions to an evaluation matrix, to obtain a depth level corresponding to each of the apparatuses;

an expansion analyzing unit, configured to analyze a plurality of expansion ratios corresponding to the depth levels of the apparatuses; and an indicator analyzing unit, configured to analyze a comprehensive indicator according to the depth levels and the expansion ratios, wherein the comprehensive indicator is a sum of products of the depth levels and the expansion ratios, and the semiconductor smart manufacturing is monitored according to the comprehensive indicator.

\* \* \* \* \*